(12) United States Patent  
Murata

(10) Patent No.: US 8,437,390 B2  
(45) Date of Patent: May 7, 2013

(54) IMAGING APPARATUS

(75) Inventor: Atsuhiro Murata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1742 days.

(21) Appl. No.: 11/755,514

(22) Filed: May 30, 2007

(65) Prior Publication Data

US 2007/0285524 A1  Dec. 13, 2007

(30) Foreign Application Priority Data

Jun. 2, 2006  (JP) ................................ 2006-154954

(51) Int. Cl.
*H04N 7/12* (2006.01)
*H04N 11/02* (2006.01)
*H04N 11/04* (2006.01)

(52) U.S. Cl.
USPC .................................. 375/240.1; 375/240.26

(58) Field of Classification Search .................... 386/117
See application file for complete search history.

(56) References Cited

U.S. PATENT DOCUMENTS

| | | | | |
|---|---|---|---|---|
| 6,424,795 B1* | 7/2002 | Takahashi et al. | ......... | 348/220.1 |
| 7,764,310 B2* | 7/2010 | Nitta | ........................... | 348/220.1 |
| 2003/0152369 A1 | 8/2003 | Isobe et al. | | |
| 2003/0202777 A1* | 10/2003 | Kogusuri | ........................ | 386/95 |
| 2004/0071452 A1* | 4/2004 | Yoda | ............................. | 386/117 |
| 2005/0083414 A1 | 4/2005 | Hidaka et al. | | |

FOREIGN PATENT DOCUMENTS

| | | |
|---|---|---|
| JP | 2003-308675 A | 10/2003 |
| JP | 2004-201170 A | 7/2004 |

* cited by examiner

*Primary Examiner* — Edan Orgad
*Assistant Examiner* — Jahangir Kabir
(74) *Attorney, Agent, or Firm* — Carter, DeLuca, Farrell & Schmidt LLP

(57) ABSTRACT

An imaging apparatus includes an image pickup unit, a recording aunit configured to record moving image data on a recording medium and record still image data on the recording medium, a conversion unit configured to convert the still image data recorded on the recording medium into moving image data to generate converted moving image data, a conversion instruction unit configured to instruct generation of the converted moving image data at an arbitrary timing, a management unit configured to manage at least one piece of still image data recorded on the recording medium as one group when the instruction is generated by the conversion instruction unit, and a control unit configured to control the conversion unit to generate a plurality of pieces of converted moving image data, and control the recording unit to finalize the recording medium after the plurality of pieces of converted moving image data are recorded.

9 Claims, 9 Drawing Sheets

IMAGING APPARATUS

BACKGROUND OF THE INVENTION

1. Field of the Invention

The present invention relates to an imaging apparatus. In particular, the present invention relates to an imaging apparatus configured to pick up and record a moving image and a still image.

2. Description of the Related Art

In recent years, digital video cameras for recording/reproducing captured images on/from a large-capacity recording medium such as a digital versatile disc (DVD) have been widely used. A DVD-Video format as one of the DVD formats has been employed as a format for video products such as motion picture, drama, and sports. Meanwhile, the DVD-video format has also been applied to home DVD players.

The DVD-video format premises that data is edited through authoring. Thus, once a moving image content is recorded on a DVD, the recorded content cannot be edited. In addition, after a disk is subjected to finalization, data cannot be added (rewritten). However, moving images can be rewritten on a versatile disk such as a DVD-rewritable (DVD-RW) by canceling the performed finalization. The term "finalization" refers to processing for finalizing recording processing of a disk. In the DVD-video format, a reproduction compatibility with general DVD players is ensured through the finalization. That is, after a video disk is finalized, the video disk conforms to the DVD-video format.

In the DVD-video format, a moving image recorded on a disk is managed in terms of title(s) and chapter(s). One title includes one or more chapters. A title and a chapter constitute a hierarchical structure.

For example, in the case of recording images captured with a video camera based on the DVD-video format, moving image data (hereinafter referred to as "moving image clip") recorded in one recording process is dealt with as a chapter. Furthermore, an aggregate of chapters is managed as a title under predetermined conditions.

With the above-described management of a moving image clip, increase in the number of titles possibly occurring after each photographing operation can be prevented. That is, in the DVD-video format, the maximum number of titles recordable on one disk is designated to 99. Furthermore, one title can include 99 chapters at the maximum.

As described above, moving image clips captured in one photographing operation is dealt with as one chapter, and the maximum recordable number of moving image clips on one disk can be expressed as "99 titles (the maximum number of titles per disk)×99 chapters (the maximum number of chapters per title)".

A title is closed when moving image clips are captured beyond 99 chapters, a screen aspect ratio is changed, a recording rate is changed, or when a disk is ejected. In this regard, Japanese Patent Application Laid-Open No. 2003-308675 (corresponding to U.S. Patent Application Publication No. US 2003/0152369 A1) discusses a method for recording a plurality of chapters recorded on the same day as one title.

In recent years, most digital video cameras can capture still images as well as moving images. In the case of a DVD, for example, moving images are encoded and recorded in Moving Picture Experts Group (MPEG) format. On the other hand, still images are encoded and recorded in Joint Photographic Experts Group (JPEG) format. However, most of general DVD players have only a moving image reproduction function. Thus, a still image cannot be reproduced on a general DVD player. Accordingly, a user cannot view the still image on a general DVD player.

In order to overcome the above problem, Japanese Patent Application Laid-Open No. 2004-201170 (corresponding to U.S. Patent Application Publication No. US 2005/0083414A1) discusses a method in which still image data is once decoded and is subsequently encoded again in the MPEG format so that the MPEG-coded image data is converted into moving image data in a slide show format (hereinafter referred to as a "photomovie").

However, when a photomovie is generated, a moving image previously recorded on a DVD is closed as one title, and a photomovie itself is recorded as one title. Thus, the number of titles increases every time a new photomovie is generated. Accordingly, the remaining number of recordable moving image clips is reduced.

In addition, moving images recorded on a disk conforming to the DVD-video format are reproduced in the order of recording (reproduced from moving image data recorded in an inner track of the disk). Accordingly, a moving image clip and a photomovie are reproduced mixed with each other.

SUMMARY OF THE INVENTION

The present invention is directed to an imaging apparatus that does not reduce the remaining number of recordable moving image clips even when a plurality of photomovies are generated.

According to an aspect of the present invention, an imaging apparatus includes an image pickup unit configured to shoot a subject to generate moving image data and still image data, a recording unit configured to record the moving image data generated by the image pickup unit according to an instruction for recording a moving image on a recording medium in a moving image recording format, and record still image data generated by the image pickup unit according to an instruction for recording a still image on the recording medium in a still-image recording format, a conversion unit configured to convert the still image data recorded on the recording medium into moving image data according to the moving image recording format to generate converted moving image data, a conversion instruction unit configured to generate an instruction for generating the converted moving image data at an arbitrary timing, a management unit configured to manage at least one piece of still image data recorded on the recording medium as one group when the instruction is generated by the conversion instruction unit, wherein the management unit newly generates a still image data group every time the conversion instruction unit generates the instruction, and a control unit configured to control the conversion unit to generate a plurality of pieces of converted moving image data based on still image data included in a plural still image data groups in response to an instruction for finalizing the recording medium and to control the recording unit to finalize the recording medium after the plurality of pieces of converted moving image data generated by the conversion unit is recorded on the recording medium in the moving image recording format.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will now herein be described in detail with reference to the drawings. It is be noted that the relative arrangement of the components, the numerical expressions, and numerical values set forth in these embodiments are not intended to limit the scope of the present invention unless it is specifically stated otherwise.

Figure 1:
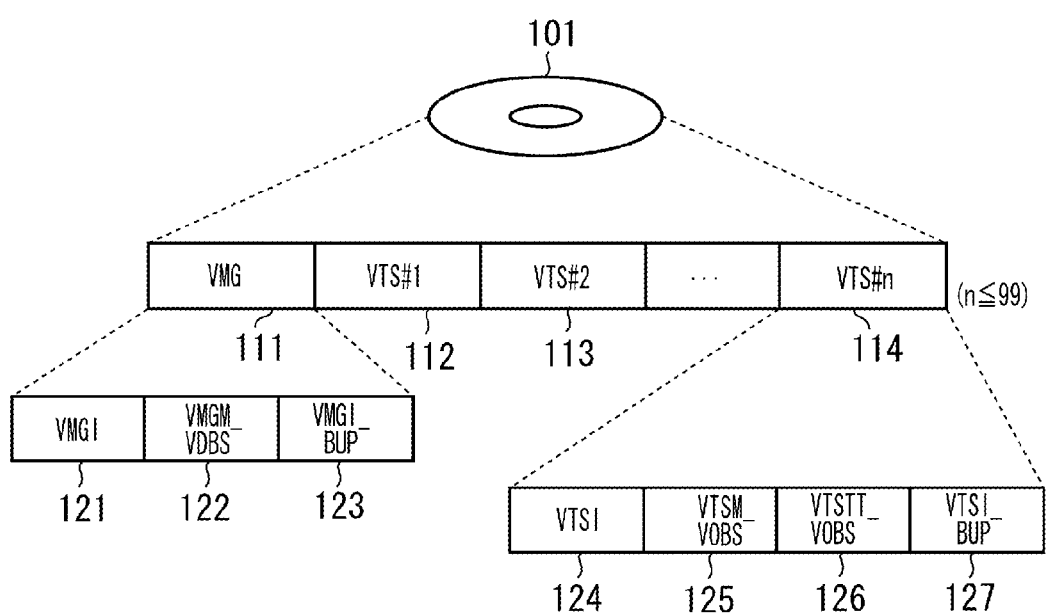
FIG. 1 illustrates an example of a structure of data recorded on a recording medium.

FIG. 1 illustrates an example of a data structure conforming to a DVD-video format. Referring to FIG. 1, on a recording medium 101, information necessary for reproducing moving image data such as a video manager (VMG) 111 and Video Title Sets (VTSs) #1 112 through VTS#n 114 are recorded.

The VMG 111 includes video manager information (VMGI) 121, a Video Manager Menu Video Object Set (VMGM_VOBS) 122, and a Video Manager Information Backup (VMGI_BUP) 123. The VMGI 121 is management information for controlling the entire recorded data. The VMGM_VOBS 122 is content information for setting a title menu screen. The VMGI_BUP 123 is a complete copy of the VMGI 121 and is used as backup information.

The VTSs 112 through 114 (the VTS 114 is a last VTS) each include Video Title Set Information (VTSI) 124, a Video Title Set Menu Video Object Set (VTSM_VOBS) 125, a Video Title Set Video Object Set (VTSTT_VOBS) 126, and a Video Title Set Information Backup (VTSI_BUP) 127.

The VTSI 124 is management information for controlling each of the VTSs 112 through 114. The VTSM_VOBS 125 is content information for setting various menu screens in each of the VTSs 112 through 114. The VTSTT_VOBS 126 is contents for reproducing a title, for example, video data. The above photomovie corresponds to the VTSTT_VOBS 126. The VTSI_BUP 127 is a complete copy of the VTSI 124 and is used as backup information.

Figure 2:
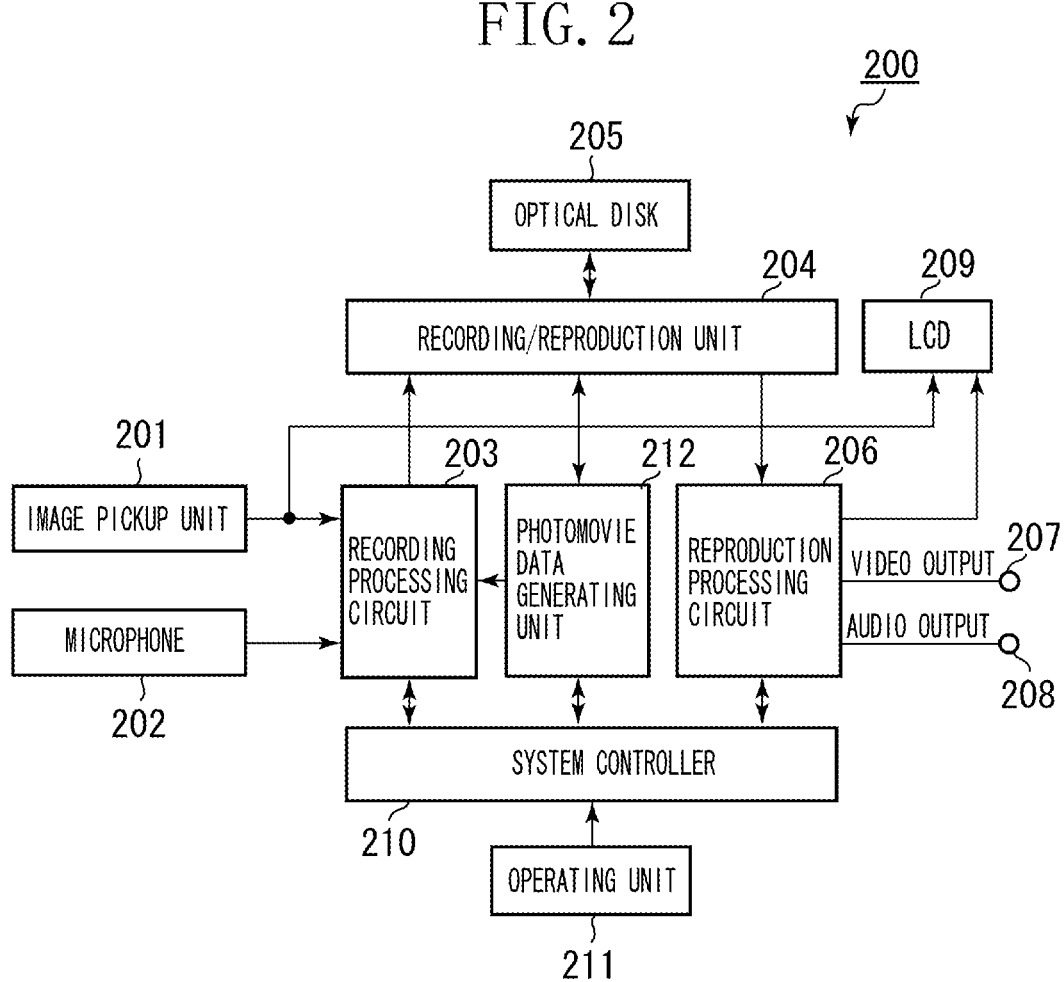
FIG. 2 is a block diagram illustrating a configuration of a digital video camera according to an exemplary embodiment of the present invention.

FIG. 2 is a block diagram illustrating a functional configuration example of a digital video camera 200 of the present exemplary embodiment.

Referring to FIG. 2, the digital video camera 200 includes an image pickup unit 201 and a microphone 202. Furthermore, the digital video camera 200 includes a recording processing circuit 203. The recording processing circuit 203 performs necessary processing on image data and audio data captured with the image pickup unit 201 and the microphone 202. In addition, the recording processing circuit 203 encodes the image data and audio data based on a publicly known coding method to reduce a data amount.

The digital video camera 200 also includes a recording/reproduction unit 204. The recording/reproduction unit 204 writes and reads data on/from an optical disk 205 according to a predetermined file system such as Universal Disc Format (UDF). That is, the recording/reproduction unit 204 converts data output from the recording processing circuit 203 into a predetermined format suitable for recording data on the optical disk 205, and records the converted data as a file on the optical disk 205. In addition, the recording/reproduction unit 204 reads data recorded on the optical disk 205.

Furthermore, the digital video camera 200 includes a photomovie generation unit 212. The photomovie generation circuit 212 decodes still image data recorded on the optical disk 205 and then encodes again the decoded data into MPEG format in order to convert the data into moving image data to generate a photomovie. In addition, the digital video camera 200 includes a reproduction processing circuit 206. The reproduction processing circuit 206 decodes image data and audio data reproduced by the recording/reproduction unit 204 and outputs the decoded data.

The digital video camera 200 includes a video data output terminal 207 and an audio data output terminal 208. In addition, the digital video camera 200 includes a liquid crystal display (LCD) 209. The LCD 209 is used for displaying an image related to image data output from the image pickup unit 201 and the reproduction processing circuit 206. Furthermore, the digital video camera 200 includes a system controller 210 and an operating unit 211. The system controller 210 controls an operation of the digital video camera 200. The operation unit 211 includes a power switch, a recording trigger, a playback switch, and a stop switch, or an edit switch for editing a playback list.

In the present exemplary embodiment, a DVD is used as the optical disk 205, and moving image data is recorded on the optical disk 205 in the DVD-video format. The digital video camera 200 according to the present exemplary embodiment has a still-image recording and reproduction function as well as a moving-image recording and reproduction function.

When a moving image shooting mode is set through an operation of the operating unit 211 and a start of recording is instructed through an operation of the recording trigger in the operating unit 211, the system controller 210 controls the recording processing circuit 203 to start recording. The recording processing circuit 203 encodes image data and audio data captured by the image pickup unit 201 and the microphone 202 into a predetermined format, and then outputs the encoded data to the recording/reproduction unit 204.

The recording/reproduction unit 204 converts the encoded data output from the recording processing circuit 203 into a format suitable for recording by adding header information or other such additional information. After that, the recording/reproduction unit 204 records the encoded data on the optical disk 205.

When an instruction to stop recording is generated, recording of data on the optical disk 205 is suspended. In the present embodiment, moving image data and audio data recorded from the start through the end of recording is managed as one chapter in DVD-video format. Furthermore, the titles are divided and separately managed under a predetermined condition when the number of chapters in one title reaches 99, or the optical disk 205 is ejected.

Furthermore, when a still image shooting mode is set via the operating unit 211 and an instruction for shooting a still image is issued through an operation of the recording trigger in the operating unit 211, the system controller 210 controls the recording processing circuit 203 to start recording. The recording processing circuit 203 extracts image data of one frame output from the image pickup unit 201 at the timing an instruction to capture a still image is issued. Then, the recording processing circuit 203 encodes the still image data of one frame and outputs the encoded data to the recording/reproduction unit 204. The recording/reproduction unit 204 adds header information and other additional information to the encoded still image data according to a predetermined file format, and records the still image data on the optical disk 205.

In the present embodiment, the still image data is managed as a file according to a format different from the DVD-video format. That is, the still image data is recorded on the optical disk 205 according to a format different from the moving image data. Therefore, still image data recorded on the optical disk 205 with the video camera according to the present embodiment cannot be reproduced by a general DVD player. However, the still image data can be reproduced by the video camera 200.

Figure 3:
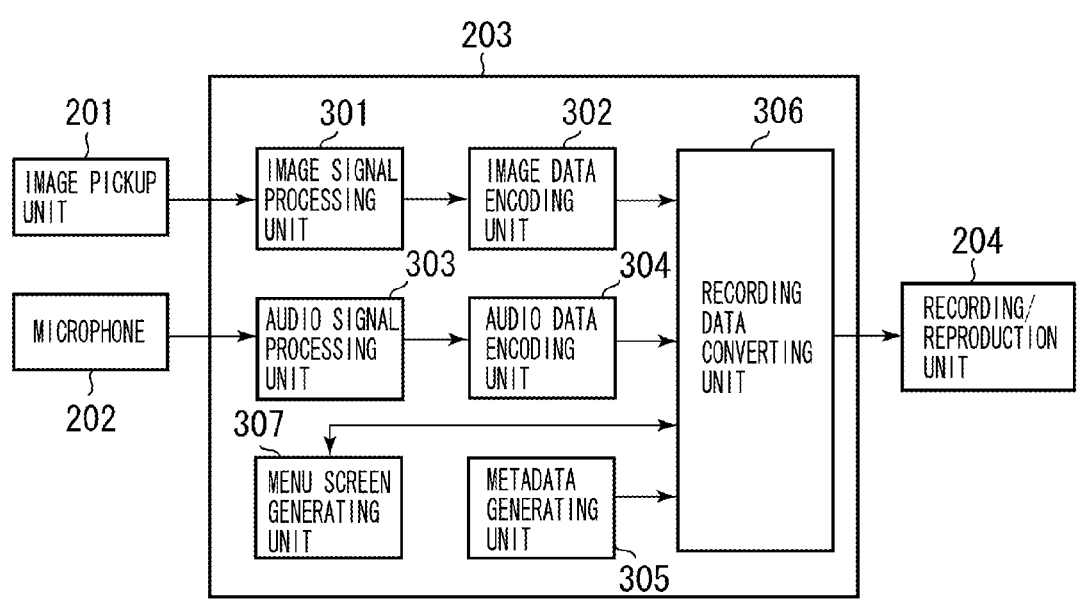
FIG. 3 is a block diagram illustrating a configuration of recording processing circuits and circuit peripherals thereto according to an exemplary embodiment of the present invention.

FIG. 3 is a block diagram illustrating a configuration of primary components of the recording processing circuit 203 and circuits peripheral thereto according to the present embodiment.

Referring to FIG. 3, the image pickup unit 201 sends image data to an image signal processing unit 301. The image signal processing unit 301 performs subsampling on image data captured by the image pickup unit 201, according to a predetermined encoding format, and outputs the processed data to an image data coding unit 302.

The image data coding unit 302 encodes moving image data captured by the image signal processing unit 301 according to Moving Picture Experts Group Phase 2 (MPEG-2) format. Furthermore, the image data coding unit 302 encodes still image data sent from the image signal processing unit 301 according to the JPEG format. The encoded data is output to the recording data converting unit 306. Furthermore, the image data coding unit 302 generates thumbnail image data as a representative image of one data file, and outputs the thumbnail image data to the recording data converting unit 306.

The microphone 202 outputs audio data to an audio signal processing unit 303. The audio signal processing unit 303 converts the audio data sent from the microphone 202 into digital data, performs noise suppression and amplification on the data, and outputs the processed data to an audio data coding unit 304. The audio data coding unit 304 encodes audio data sent from the audio signal processing unit 303 according to the MPEG-2 format and outputs the coded data to the recording data converting unit 306. In the still-image shooting mode, audio data is neither input nor recorded.

The recording data converting unit 306 adds necessary additional information to encoded moving image data and audio data in the moving image shooting mode, converts the data into a MPEG-2 transport stream format and outputs the data to the recording/reproduction unit 204. Furthermore, in the still-image shooting mode, the recording data converting unit 306 adds necessary information to encoded still image data, and outputs the still image data to the recording/reproduction unit 204.

A metadata generation unit 305 generates metadata describing photography information such as shooting date and time and an F-number used in the shooting, and outputs the generated metadata to the recording data converting unit 306. The recording data converting unit 306 arranges the metadata to be recorded in a header or a footer of an image data file and an audio data file. Then, the recording data converting unit 306 outputs the metadata to the recording/reproduction unit 204. A menu screen generating unit 307 generates image data to be displayed on a menu screen for displaying thumbnail images each indicating a representative image of one data file in a list, as necessary. Then, the menu screen generating unit 307 outputs the image data to the recording data converting unit 306.

The digital video camera 200 according to the present embodiment performs shooting during an interval between the trigger to start recording to the trigger to stop recording, and records the captured image data and audio data as one file. Then, the recording data converting unit 306 stores metadata input from the metadata generation unit 305 in a header or footer of each file. In addition, in a header of each file, information such as a file name is also recorded.

When a reproduction mode is set through an operation via the operating unit 211, the system controller 210 controls the reproduction processing circuit 203 to decode a head image in a data file recorded on the optical disk 205, generates thumbnail image data of the head image, and displays the generated thumbnail image on the LCD 209.

Then, a user verifies the thumbnail image displayed on the LCD 209, and selects a file that the user desires to reproduce via an operation of the operating unit 211. After the user selects a file to be reproduced, the system controller 210 controls the reproduction processing circuit 206 to display, on the LCD 209, information regarding the metadata of a file that is currently reproduced.

The reproduction processing circuit 206 controls the recording/reproduction unit 204 to reproduce the selected file. If the selected file includes still image data, the reproduction processing circuit 206 decodes the still image data and then outputs the decoded data via the image data output terminal 207, and displays the reproduced image on the LCD 209.

Furthermore, if the designated file includes moving image data, the reproduction processing circuit 206 decodes the moving image data and audio data in the file, and outputs the moving image data via the output terminal 207 and the audio data via the output terminal 208.

Figure 4:
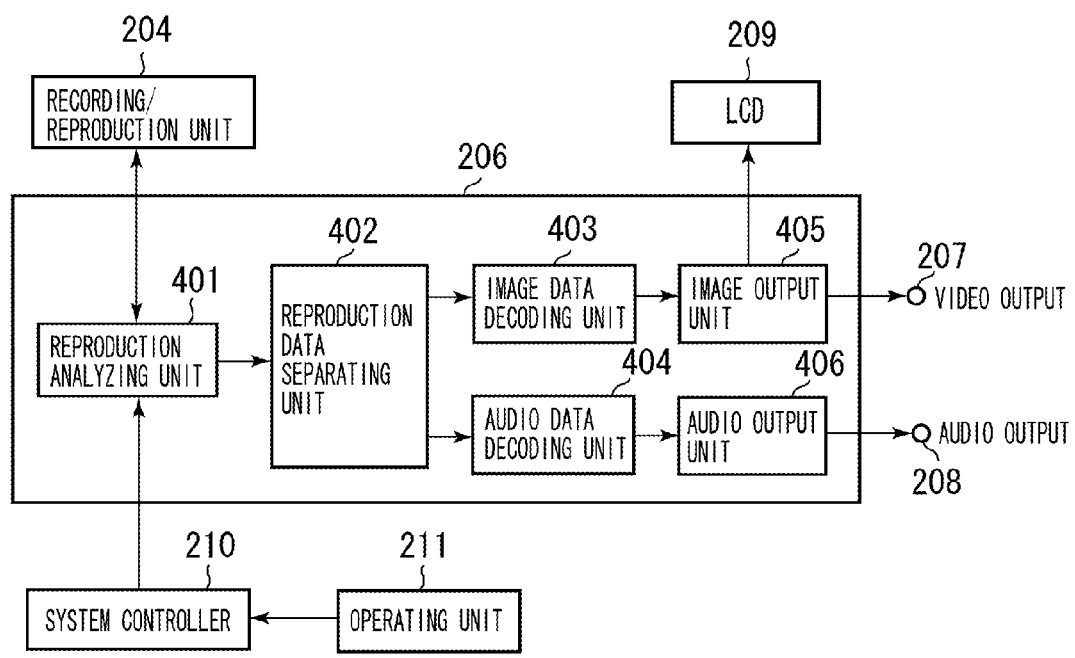
FIG. 4 is a block diagram illustrating a configuration of recording processing circuits and circuit peripherals thereto according to an exemplary embodiment of the present invention.

FIG. 4 is a block diagram illustrating a functional configuration of the reproduction processing circuit 206 and circuit peripheral thereto according to the present embodiment.

In FIG. 4, when the system controller 210 issues a reproduction command to a reproduction analyzing unit 401, the reproduction analyzing unit 401 analyzes a file name, a recording position, and a file type of the file selected by the user. Then, the system controller 210 instructs the recording/reproduction unit 204 to reproduce the selected file. The data reproduced by the recording/reproduction unit 204 is output to a reproduction data separating unit 402.

The reproduction data separating unit 402 detects image data and audio data from the reproduced data sequence, and further detects metadata from a header and a footer of the file. Then, the reproduction data separating unit 402 outputs the image data to an image data decoding unit 403 and the audio data to an audio data decoding unit 404.

When the reproduced data is still image data, the reproduction data separating unit 402 sends the still image data to the image data decoding unit 403. When the reproduced data is moving image data, the image data decoding unit 403 decodes the moving image data encoded according to the MPEG format and outputs the decoded data to an image output unit 405. The image output unit 405 converts the decoded image data into a format suitable for displaying and processing in an external monitor and other external devices, and then outputs the converted data to the image data output terminal 207 or the LCD 209.

The audio data decoding unit 404 decodes audio data input from the reproduction data separating unit 402 and outputs the decoded data to an audio output unit 406. The audio output unit 406 converts the decoded audio data into a format suitable for processing in an external device, and outputs the converted data to the audio data output terminal 208.

When the reproduced data is still image data, the image data decoding unit 403 decodes the still image data encoded according to the JPEG format, and then sends the decoded data to the image output unit 405. The image output unit 405 includes a memory. The image output unit 405 stores the decoded still image data of one screen in the memory, and then repeatedly outputs the stored still image data to the video data output terminal 207.

Figure 5:
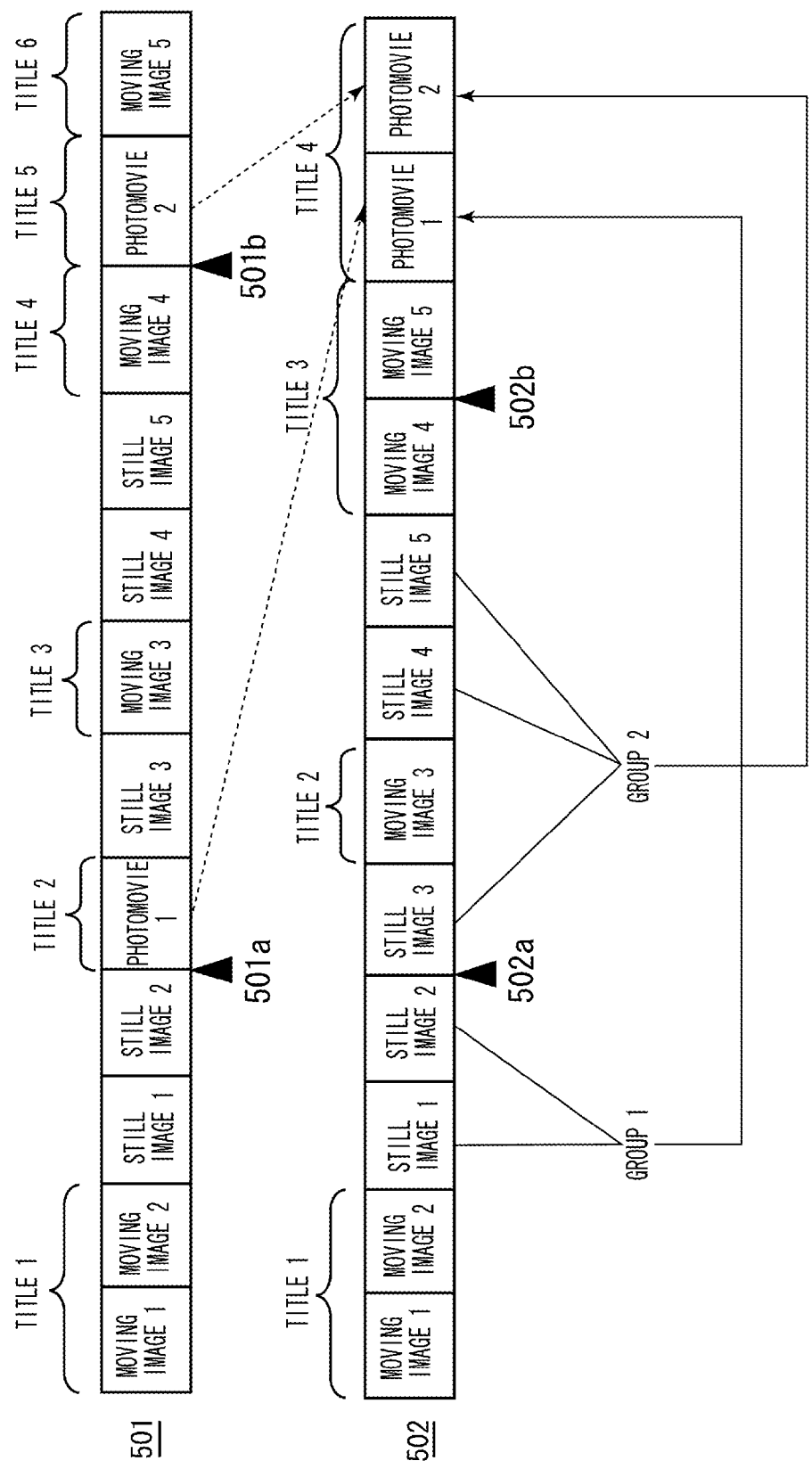
FIG. 5 illustrates how data is recorded on a disk according to an exemplary embodiment of the present invention.

FIG. 5 illustrates how moving images, still images, and a photomovie are recorded on a disk. Here, a photomovie 1 is generated based on still images 1 and 2, and a photomovie 2 is generated based on still images 3 through 5.

Referring to FIG. 5, an example 501 illustrates a case where a photomovie is generated and recorded according to an instruction for generating a photomovie. In the present embodiment, a user can issue an instruction for generating a photomovie at an arbitrary timing.

Every time a user detects photomovie generation events 501a and 501b through his operation, the photomovie generation unit 212 immediately generates photomovies 1 and 2. When shooting a still image and generation of a photomovie are performed, a current tile of previously recorded moving image data is closed. Data captured from a next shooting is recorded as a new title. Thus, in the case of the example 501, six titles are created. Note that division of titles under different conditions is not considered here.

An example 502 in FIG. 5 illustrates a case where a photomovie is generated by the digital video camera 200 according to the present embodiment. The photomovie generation unit 212 does not immediately generate a photomovie when the photomovie generation evens 502a and 502b are detected.

That is, when an instruction for generating a photomovie is issued, the system controller 210 sets a photomovie generation flag described in Temporary Video Manager Information (TMP_VMGI) as management information alternative to the VMGI 121, which is written at the time of closing a title.

Then, the system controller 210 checks a status of the photomovie generation flag during finalization of the optical disk 205. If the photomovie generation flag is set, photomovie generation unit 212 generates a photomovie in a predetermined unit. One such predetermined unit includes one or more still images captured during a period from the time a previous photomovie generation event is issued, to the time a next photomovie generation event is newly issued.

Instead of recording a photomovie generation flag in the TMP_VMGI, group information can be added to the still image data captured during the period from the time a previous photomovie generation event is issued and to the time a next photomovie generation event is newly issued.

In the case of the example 502, the system controller 210 records group information indicating a group 1 as information added to the still images 1 and 2 which are captured in the still-image shooting mode. When the photomovie generation event 502a is issued, the system controller 210 records group information indicating a group 2 as information added to still images 3 through 5, which are shot after the photomovie generation event 502a is issued.

From then on, the system controller 210 increments the group number every time a photomovie generation event is detected. The group number is used when a photomovie is generated during the finalization processing. That is, the system controller 210 generates one photomovie with the photomovie generation unit 212, based on still image data having the same group number.

Instead of the group information, information similar to the group information can be written to temporary management information such as still image management information and the TMP_VMGI. That is, the information similar to the group information can be alternatively used in the present embodiment.

Figure 9:
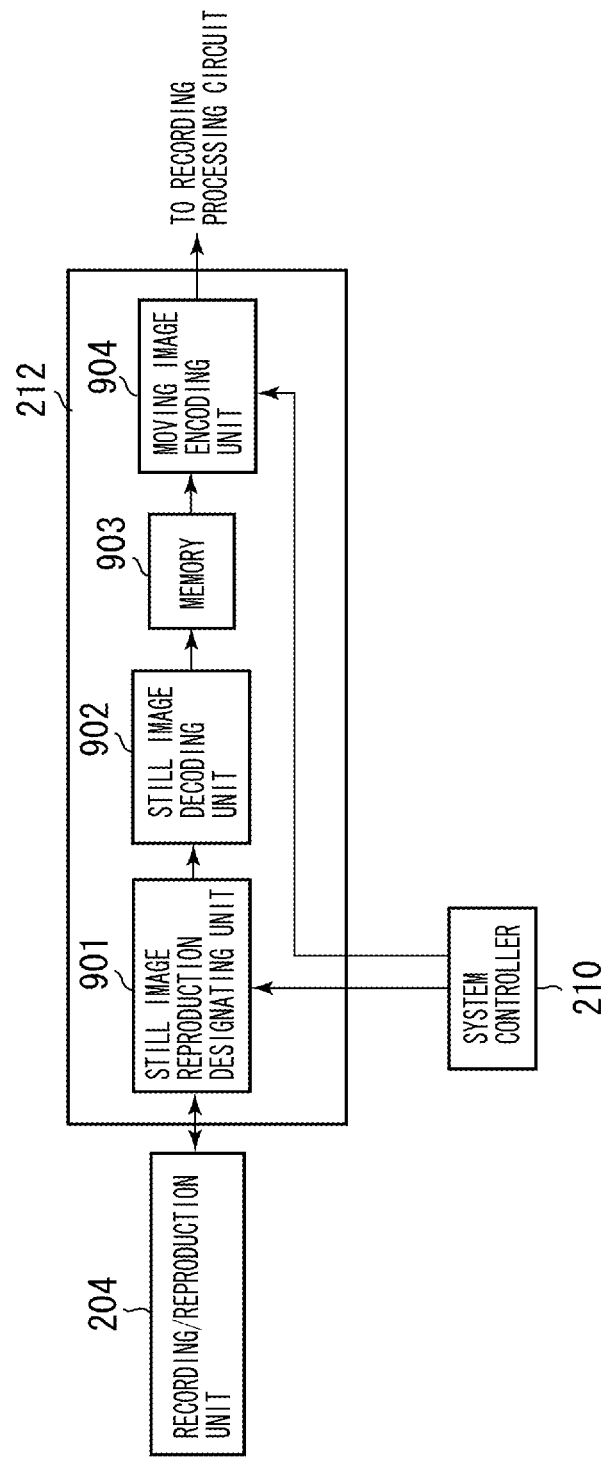
FIG. 9 illustrates a configuration of a photomovie generation unit according to an exemplary embodiment of the present invention.

FIG. 9 illustrates an exemplary configuration of the photomovie generation unit 212 and blocks peripheral thereto.

When a photomovie generation instruction is issued from the system controller 210, a still image reproduction designating unit 901 instructs the recording/reproduction unit 204 to reproduce still image data selected by the user. When the still image data is reproduced by the recording/reproduction unit 204, the still image reproduction designating unit 901 sends the reproduced still image data to a still image decoding unit 902.

The still image decoding unit 902 decodes the reproduced still image data and stores the data in a memory 903. Then, a moving image encoding unit 904 changes a size of the still image data stored in the memory 903 into a predetermined size (for example, Video Graphics Adapter (VGA) size of 720×480 pixels). Then, the moving image encoding unit 904 repeatedly reads the data for a predetermined period, i.e., several seconds and encodes the read still image data according to the MPEG-2 format to convert the still image data into moving image data.

The data of the photomovie thus generated is sent to the recording data converting unit 306 of the recording processing circuit 203 and recorded on the optical disk 205 by the recording/reproduction unit 204 as described above.

As illustrated in FIG. 5, the system controller 210 instructs the still image reproduction instructing unit 901 and the moving image coding unit 904 to generate one photomovie based on still image data in the same group.

Figure 6:
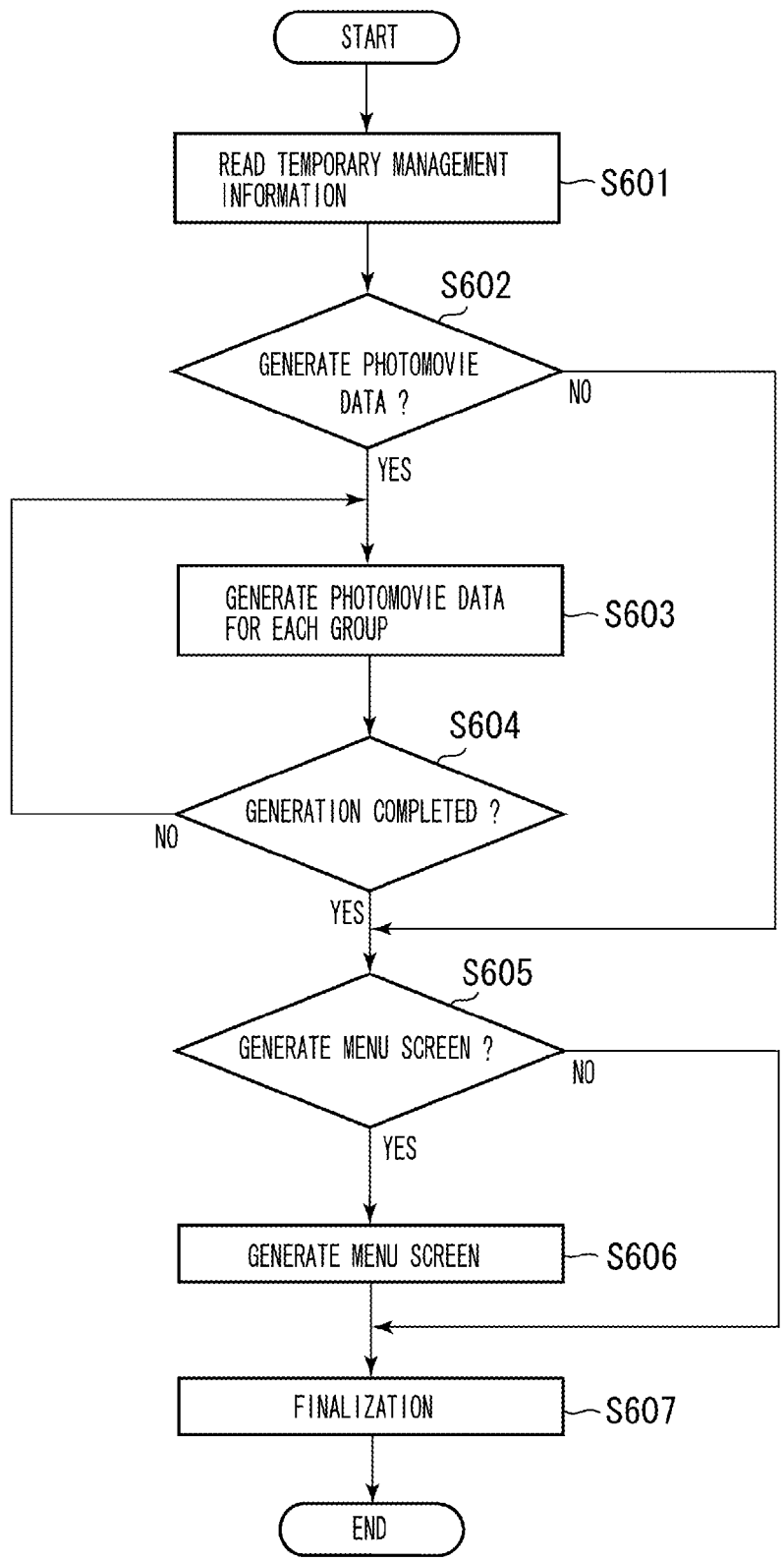
FIG. 6 is a flow chart illustrating a finalization procedure according to an exemplary embodiment of the present invention.

FIG. 6 is a flowchart illustrating an example of a series of processing performed during finalization by the digital video camera 200 according to the present embodiment.

When the operating unit 211 generates an instruction for finalization, the system controller 210 instructs the reproduction processing circuit 206 to read temporary management information recorded on the optical disk 205 (step S601). Then, the system controller 210 reads a photomovie generation flag in the temporary management information to determine whether a photomovie is to be generated (step S602).

If, as a result of the determination, it is determined that no photomovie is to be generated (NO in step S602), then the system controller 210 advances to step S605. On the other hand, if, as a result of the determination in step S602, it is determined that a photomovie is to be generated (YES in step S602), then the system controller 210 generates a photomovie on the group basis as described above (step S603).

Then, the system controller 210 determines whether generation of a photomovie is completed (step S604). As a result of the determination in step S604, if it is determined that the generation of a photomovie has not been completed yet (NO in step S604), then the system controller 210 returns to step S603. In step S603, the system controller 210 generates a remaining photomovie.

On the other hand, if, as a result of the determination in step S604, it is determined that the generation of a photomovie has been completed (YES in step S604), then the system controller 210 determines whether the menu screen generating unit 307 generates a menu screen that displays representative images of each chapter in a list (step S605). If, as a result of the determination in step S605, it is determined that a menu screen is to be generated (YES in step S605), then the menu screen generating unit 307 generates a menu screen (step S606). On the other hand, if, as a result of the determination in step S605, it is determined that a menu screen is not to be generated (NO in step S605), then the system controller 210 advances to step S607.

Then, the recording/reproduction unit 204 performs finalization (a file system, a lead-in, a lead-out, and if necessary, dummy data, are written in the finalization) (step S607), and the system controller 210 ends the processing. Thus, the optical disk 205 conforming to the DVD-video format is obtained.

As described above, in the present embodiment, photomovies are collectively generated during finalization. Accordingly, each photomovie can be managed as a chapter and up to 99 photomovies can be collectively managed as one title. Furthermore, a title is not divisionally made between moving images when a photomovie is generated. Accordingly, the maximum recordable number of images can be increased.

For example, an actual photomovie is not generated between moving images 4 and 5 illustrated in the example 502 in FIG. 5. Accordingly, in this case, a title is not divided. Thus, in the example 502, four titles are generated. If the number of photomovies exceeds 99, a title is generated as needed.

As illustrated in FIG. 5, although the same content is recorded in the examples 501 and 502, the number of titles in the example 502 is smaller than the example 501. That is, the number of titles is reduced in the example 502. Furthermore, portions of a moving image that is not divided for a new title due to generation of a photomovie can be seamlessly reproduced.

Furthermore, when data is recorded in the method illustrated in the example 502, a moving image and a photomovie are separated from each other. Accordingly, the menu screen can be configured so that the user can easily confirm the content of the moving image and the photomovie.

Figure 7:
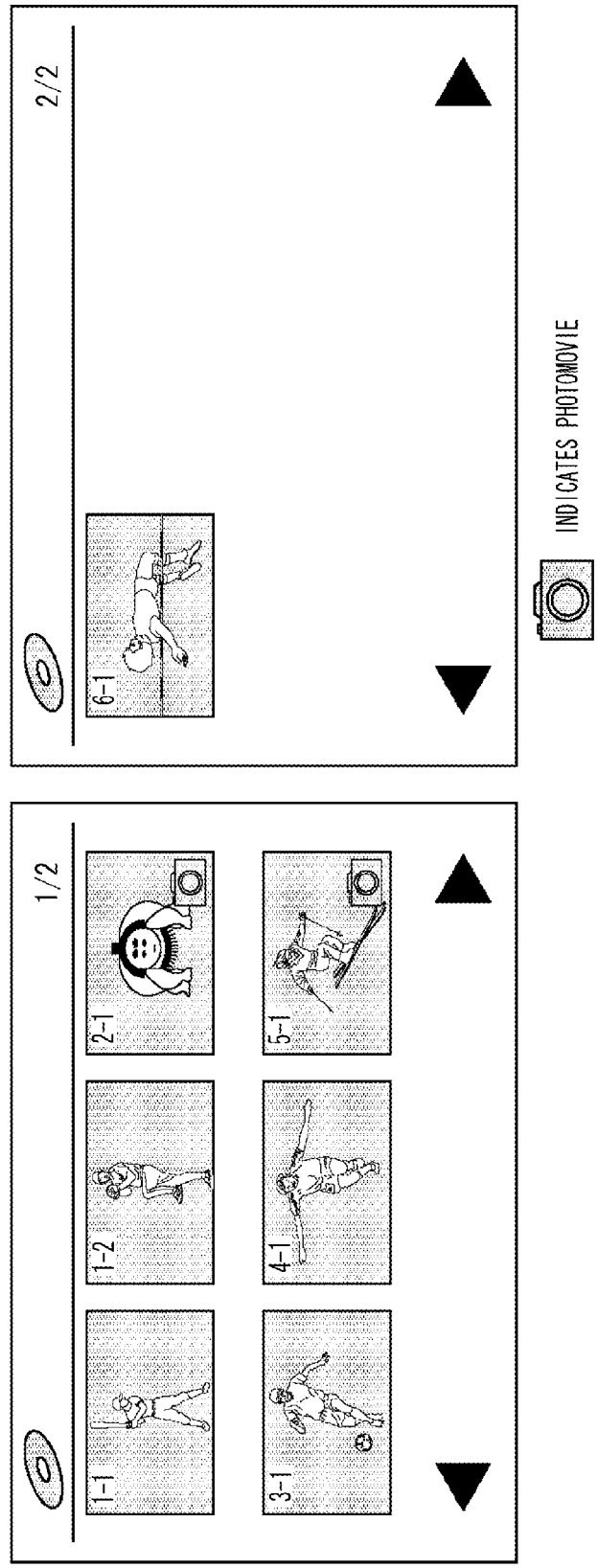
FIG. 7 illustrates a menu screen according to an exemplary embodiment of the present invention.
Figure 8:
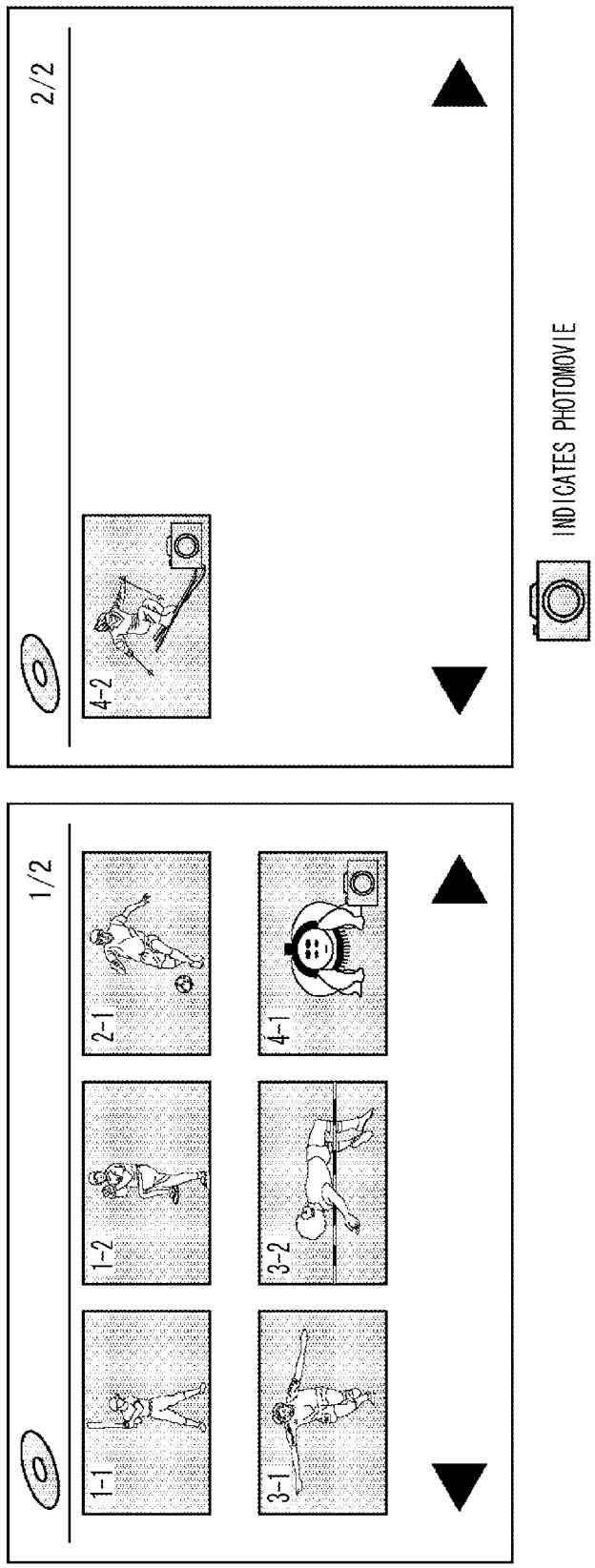
FIG. 8 illustrates a menu screen according to an exemplary embodiment of the present invention.

FIGS. 7 and 8 each illustrate an example of a menu screen generated during the recording processing performed in the examples 501 and 502 of FIG. 5. As illustrated in the examples in FIGS. 7 and 8, a photomovie is reproduced at a midpoint in the example of FIG. 7, but a photomovie is reproduced in the latter half in the example of FIG. 8.

In the present embodiment, the optical disk 205 is used as a recording medium. However, the present invention is not limited to an optical disk, and any recording medium that would enable practice of the present invention is applicable. Furthermore, the present invention can be interpreted as a method including a series of processing procedures as well as the digital video camera 200 that performs the processing procedures described above.

In the present embodiment, photomovies are collectively generated during finalization. However, generation of photomovies is not limited to this approach. For example, instead of collectively generating photomovies during finalization, photomovies can be generated at the timing of closing a title of moving image data. Also, photomovies can be generated at such timing that the number of captured moving image clips exceeds 99 chapters, an aspect ratio of a screen is changed, a recording rate is changed, and a disk is ejected. In addition to these methods of generating photomovies, any other methods that would enable practice of the present invention are applicable.

That is, photomovies are collectively generated at a predetermined timing that is different from a timing of issuing an instruction for generating a photomovie. Therefore, still image data can be converted into a photomovie at an arbitrary timing while the number of titles for moving image data is reduced.

Each unit constituting the imaging apparatus according to the above-described exemplary embodiments and each step in the method for controlling the imaging apparatus can be implemented by executing a computer-readable program stored in a RAM or a ROM of a computer. The program and a computer-readable recording medium storing the program are included in the scope of the present invention.

Furthermore, the present invention can be implemented, for example, in a system, an apparatus, a method, a program, and a recording medium. In particular, the present invention can be applied to a system including a plurality of devices and to an apparatus that includes one device.

The present invention can be implemented by directly or remotely supplying a program of software implementing functions of the above-described exemplary embodiments (in the exemplary embodiments, the program corresponding to the processing performed according to the flow chart in FIG. 6) to a system or an apparatus, and reading and executing supplied program codes with the system or a computer of the apparatus.

Accordingly, the program code itself, which is installed to the computer for implementing the functional processing of the present invention in the computer, implements the present invention. That is, the present invention also includes the computer program implementing the functional processing of the present invention.

Accordingly, the program can be configured in any form, such as object code, a program executed by an interpreter, and script data supplied to an operating system (OS).

As the recording medium for supplying such program code, for example, a floppy disk, a hard disk, an optical disk, a magneto-optical disk (MO), a CD-ROM, a CD-R, a CD-RW, a magnetic tape, a nonvolatile memory card, a ROM, and a DVD (a DVD-ROM and a DVD-R) can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a WWW server for allowing a plurality of users to download the program file for implementing the functional processing constitutes the present invention.

Further, in another aspect of the embodiment of the present invention, the above program can also be supplied by distributing a recording medium such as a CD-ROM and the like which stores the program according to the present invention after an encryption thereof, allowing the user who is qualified for a prescribed condition to download key information for decoding the encryption from the web site via the Internet, and executing and installing in the computer the encrypted program code by using the key information.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-154954 filed Jun. 2, 2006, which is hereby incorporated by reference herein in its entirety.

What is claimed is:

1. An imaging apparatus comprising:
 a processor configured to execute at least one computer program;
 an image pickup unit configured to shoot a subject to generate moving image data and still image data;
 a recording unit configured to record the moving image data generated by the image pickup unit according to an instruction for recording a moving image on a recording medium in a moving image recording format, and record still image data generated by the image pickup unit according to an instruction for recording a still image on the recording medium in a still image recording format;
 a conversion unit configured to convert the still image data recorded on the recording medium into moving image data in the moving image recording format to generate converted moving image data;
 a receiving unit configured to receive a generation instruction for generating the converted moving image data from a user;
 a management unit configured to generate a group of the still image data recorded on the recording medium in accordance with the generation instruction received by the receiving unit,
 wherein, if a first generation instruction is received by the receiving unit, the management unit generates a first group including the still image data recorded before the first generation instruction and, if a second generation instruction is received by the receiving unit after the first generation instruction, the management unit generates a second group, which is different from the first group, including the still image data recorded in a period from the first generation instruction to the second generation instruction, and
 wherein the management unit generates identification information for identifying still image data of a plurality of groups including the first group and the second group;
 a control unit configured to control the conversion unit to generate a plurality of pieces of the converted moving image data corresponding to a plurality of still image data groups in response to an instruction for finalizing the recording medium, and to control the recording unit to finalize the recording medium after the plurality of pieces of converted moving image data generated by the conversion unit are recorded on the recording medium in the moving image recording format,
 wherein the control unit detects the still image data of the first group and the still image data of the second group from among the plurality of pieces of still image data recorded on the recording medium using the identification information in accordance with the instruction for finalizing and controls the conversion unit such that first converted moving image data is generated from the still image data of the first group and second converted moving image data is generated from the still image data of the second group; and
 wherein the control unit controls the conversion unit in accordance with the instruction for finalizing the recording medium to generate both the first converted moving image data and the second converted moving image data.

2. The imaging apparatus according to claim 1, wherein the control unit controls the recording unit to record the identification information for identifying the still image group together with and linked with the still image data.

3. The imaging apparatus according to claim 1, wherein the moving image data is recorded on the recording medium in a hierarchical structure comprising a first level, wherein the first level is divided into one or more sub-levels, and wherein each of the plural pieces of converted moving image data is managed at the one or more sub-levels.

4. A method for generating image data that is performed by at least one computer program that is executed by a processor, the method comprising:
 shooting a subject to generate moving image data and still image data;
 recording the moving image data according to an instruction for recording a moving image on a recording medium in a moving image recording format, and recording the still image data according to an instruction for recording a still image on the recording medium in a still image recording format;
 converting, via a conversion unit controlled by a control unit, the still image data recorded on the recording medium into moving image data in the moving image recording format to generate converted moving image data;
 receiving a generation instruction for generating the converted moving image data from a user;
 generating a group of the still image data recorded on the recording medium in accordance with the generation instruction,
 wherein, if a first generation instruction is received, a first group is generated including the still image data recorded before the first generation instruction and, if a second generation instruction is received after the first generation instruction, a second group is generated, which is different from the first group, including the still image data recorded in a period from the first generation instruction to the second generation instruction;
 generating identification information for identifying still image data of a plurality of groups including the first group and the second group;

generating a plurality of pieces of the converted moving image data corresponding to a plurality of still image data groups in response to an instruction for finalizing the recording medium;

finalizing the recording medium after the plurality of pieces of converted moving image data are recorded on the recording medium in the moving image recording format;

detecting the still image data of the first group and the still image data of the second group from among the plurality of pieces of still image data recorded on the recording medium using the identification information in accordance with the instruction for finalizing;

generating the first converted moving image data from the still image data of the first group; and generating second converted moving image data from the still image data of the second group, wherein the control unit controls the conversion unit in accordance with the instruction for finalizing the recording medium to generate both the first converted moving image data and the second converted moving image data.

5. The method according to claim 4, further comprising recording identification information for identifying the still image group together with and linked with the still image data.

6. A non-transitory computer-readable storage medium storing computer-executable process steps, the computer-executable process steps causing a computer to perform a method of generating image data that is performed by at least one computer program that is executed by a processor, the method comprising:

shooting a subject to generate moving image data and still image data;

recording the moving image data according to an instruction for recording a moving image on a recording medium in a moving image recording format, and recording the still image data according to an instruction for recording a still image on the recording medium in a still image recording format;

converting, via a conversion unit controlled by a control unit, the still image data recorded on the recording medium into moving image data in the moving image recording format to generate converted moving image data;

receiving a generation instruction for generating the converted moving image data from a user;

generating a group of the still image data recorded on the recording medium in accordance with the generation instruction, wherein, if a first generation instruction is received, a first group is generated including the still image data recorded before the first generation instruction and, if a second generation instruction is received after the first generation instruction, a second group is generated, which is different from the first group, including the still image data recorded in a period from the first generation instruction to the second generation instruction;

generating identification information for identifying still image data of a plurality of groups including the first group and the second group;

generating a plurality of pieces of the converted moving image data corresponding to a plurality of still image data groups in response to an instruction for finalizing the recording medium;

finalizing the recording medium after the plurality of pieces of converted moving image data are recorded on the recording medium in the moving image recording format;

detecting the still image data of the first group and the still image data of the second group from among the plurality of pieces of still image data recorded on the recording medium using the identification information in accordance with the instruction for finalizing;

generating the first converted moving image data from the still image data of the first group; and generating second converted moving image data from the still image data of the second group, wherein the control unit controls the conversion unit in accordance with the instruction for finalizing the recording medium to generate both the first converted moving image data and the second converted moving image data.

7. An image processing apparatus comprising:

a processor configured to execute at least one computer program;

a recording unit configured to record moving image data on a recording medium in a moving image recording format, the recording unit recording still image data on the recording medium in a still image recording format;

a conversion unit configured to convert the still image data recorded on the recording medium into moving image data to generate converted moving image data;

a receiving unit configured to receive an instruction from a user;

a management unit configured to generate a group of the still image data recorded on the recording medium in accordance with the instruction received by the receiving unit, wherein, if a first instruction is received by the receiving unit, the management unit generates a first group including the still image data recorded before the first instruction and, if a second instruction is received by the receiving unit after the first instruction, the management unit generates a second group, which is different from the first group, including the still image data recorded in a period from the first instruction to the second instruction, and wherein the management unit generates identification information for identifying still image data of a plurality of groups including the first group and the second group; and a control unit configured to control the conversion unit to generate a plurality of pieces of the converted moving image data corresponding to a plurality of still image data groups at a predetermined timing, wherein the recording unit records the plurality of pieces of converted moving image data generated by the conversion unit on the recording medium in the moving image recording format, wherein the control unit detects the still image data of the first group and the still image data of the second group from among the plurality of pieces of still image data recorded on the recording medium using the identification information and controls the conversion unit such that first converted moving image data is generated from the still image data of the first group and second converted moving image data is generated from the still image data of the second group, and wherein the control unit controls the conversion unit to generate both the first converted moving image data and the second converted moving image data at the predetermined timing.

8. A method for generating image data that is performed by at least one computer program that is executed by a processor, the method comprising:
- recording moving image data on a recording medium in a moving image recording format;
- recording still image data on the recording medium in a still image recording format;
- converting the still image data recorded on the recording medium into moving image data to generate converted moving image data;
- receiving an instruction from a user;
- generating a group of the still image data recorded on the recording medium in accordance with the instruction,
- wherein, if a first instruction is received, a first group is generated including the still image data recorded before the first instruction and, if a second instruction is received after the first instruction, a second group is generated, which is different from the first group, including the still image data recorded in a period from the first instruction to the second instruction;
- generating identification information for identifying still image data of a plurality of groups including the first group and the second group;
- controlling a conversion unit to generate a plurality of pieces of the converted moving image data corresponding to a plurality of still image data groups at a predetermined timing;
- recording the plurality of pieces of converted moving image data generated by the conversion unit on the recording medium in the moving image recording format;
- detecting the still image data of the first group and the still image data of the second group from among the plurality of pieces of still image data recorded on the recording medium using the identification information;
- generating first converted moving image data from the still image data of the first group;
- generating second converted moving image data from the still image data of the second group; and
- controlling the conversion unit to generate both the first converted moving image data and the second converted moving image data at the predetermined timing.

9. A non-transitory computer-readable storage medium storing at least one computer program that is executed by a processor, the at least one computer program performing a method for generating image data, the method comprising:
- recording moving image data on a recording medium in a moving image recording format;
- recording still image data on the recording medium in a still image recording format;
- converting the still image data recorded on the recording medium into moving image data to generate converted moving image data;
- receiving an instruction from a user;
- generating a group of the still image data recorded on the recording medium in accordance with the instruction,
- wherein, if a first instruction is received, a first group is generated including the still image data recorded before the first instruction and, if a second instruction is received after the first instruction, a second group is generated, which is different from the first group, including the still image data recorded in a period from the first instruction to the second instruction;
- generating identification information for identifying still image data of a plurality of groups including the first group and the second group;
- controlling a conversion unit to generate a plurality of pieces of the converted moving image data corresponding to a plurality of still image data groups at a predetermined timing;
- recording the plurality of pieces of converted moving image data generated by the conversion unit on the recording medium in the moving image recording format;
- detecting the still image data of the first group and the still image data of the second group from among the plurality of pieces of still image data recorded on the recording medium using the identification information;
- generating first converted moving image data from the still image data of the first group;
- generating second converted moving image data from the still image data of the second group; and
- controlling the conversion unit to generate both the first converted moving image data and the second converted moving image data at the predetermined timing.

* * * * *